United States Patent [19]

Peugeot

[11] Patent Number: 4,631,461

[45] Date of Patent: Dec. 23, 1986

[54] DEVICE FOR ELECTRICALLY CONTROLLING THE POSITION OF A SLIDING OPENING PANEL OF A MOTOR VEHICLE

[75] Inventor: Michel Peugeot, Seloncourt, France

[73] Assignee: Aciers et Outillage Peugeot, Audincourt, France

[21] Appl. No.: 685,661

[22] Filed: Dec. 24, 1984

[30] Foreign Application Priority Data

Dec. 23, 1983 [FR] France ................................ 83 20722

[51] Int. Cl.[4] ................................................ H02P 1/00

[52] U.S. Cl. .................................... 318/280; 318/286; 318/466; 318/599; 200/61.62; 49/28

[58] Field of Search ............... 318/280, 282, 286, 265, 318/266, 267, 443, 470, 466, 467, 468, 596, 663, 667, 684, 469; 361/181; 49/27, 28, 31, 55, 324; 200/61.62; 296/146, 90; 338/162, 176

[56] References Cited

U.S. PATENT DOCUMENTS 4,328,451 5/1982 Barge .............................. 318/599 X
4,351,016 9/1982 Felbinger ........................ 318/286 X
4,410,843 10/1983 Sauer et al. ..................... 318/466 X

FOREIGN PATENT DOCUMENTS 2465061 3/1981 France .

*Primary Examiner*—William M. Shoop, Jr.
*Assistant Examiner*—Shik Luen Paul Ip
*Attorney, Agent, or Firm*—Sughrue, Mion, Zinn, Macpeak and Seas

[57] ABSTRACT

This device is connected, in series with a control circuit (6) of the driving motor (7) of the panel, to a power supply (2*a*, 2*b*). It comprises a series of conductors (19*a* to 19*l*) which are electrically connected in parallel and mechanically disposed in adjacent positions, said conductors each materializing a particular position that the panel can occupy in its travel, all the conductors (19*a* to 19*l*) except one (19*f*) being connected together by one of their ends (20*b*) so as to form a first terminal (12) of the control device (5), the connection of said ends being capable of being selectively broken by a setting slider (24) whose adjustable position determines the position that the panel must reach, the opposite ends (20*a*) of all the conductors being associated with a copying slider (21, 22) which comprises a bridge element and constitutes a second terminal (13) of said control device and is capable of selectively connecting together the ends of pairs of adjacent conductors (19*a* to 19*l*), said copying slider (21, 22) being connected to move with said panel.

11 Claims, 16 Drawing Figures

DEVICE FOR ELECTRICALLY CONTROLLING THE POSITION OF A SLIDING OPENING PANEL OF A MOTOR VEHICLE

The present invention relates to a device for electrically controlling the position of a sliding opening panel of a motor vehicle, such as a window glass.

Devices controlling the movements of a sliding panel of a motor vehicle often have as a drawback the fact that the driver must actuate a selecting switch controlling the movement of the panel during the entire period during which the panel moves. Thus, the hand of the user is occupied during a relatively prolonged period and this might prejudice safety.

An object of the invention is therefore to provide a control device of the aforementioned type which does not have this drawback.

The invention therefore provides an electric control device for controlling the position of a sliding opening panel of a motor vehicle, this device being connected, in series with a control circuit of the driving motor of the panel, to a power supply, and comprising a series of conductors electrically connected in parallel and mechanically disposed in adjacent positions, said conductors each materializing a particular position capable of being occupied by the panel in its travel, all the conductors except one being connected together at one of their ends so as to constitute a first terminal of the control device, the connection of said ends being capable of being selectively opened by a setting slider whose adjustable position determines the position that the panel must reach, the opposite ends of all the conductors being associated with a slider comprising a bridge element and constituting a second terminal of the control device and capable of selectively connecting the ends of pairs of adjacent conductors, said second slider being connected to said panel.

Owing to these features, when the setting slider is brought to a predetermined position which is different from the actual position of the copying slider, the driving motor is actuated so long as the two sliders are not associated with the same conductor among the series of conductors. Thus, it is sufficient for the user to simply shift the setting slider to result in an operating cycle being carried out completely automatically with no need for the user to intervene.

A better understanding of the invention will be had from the following description, which is given soley by way of example, with reference to the accompanying drawings, in which.

Figure 1:
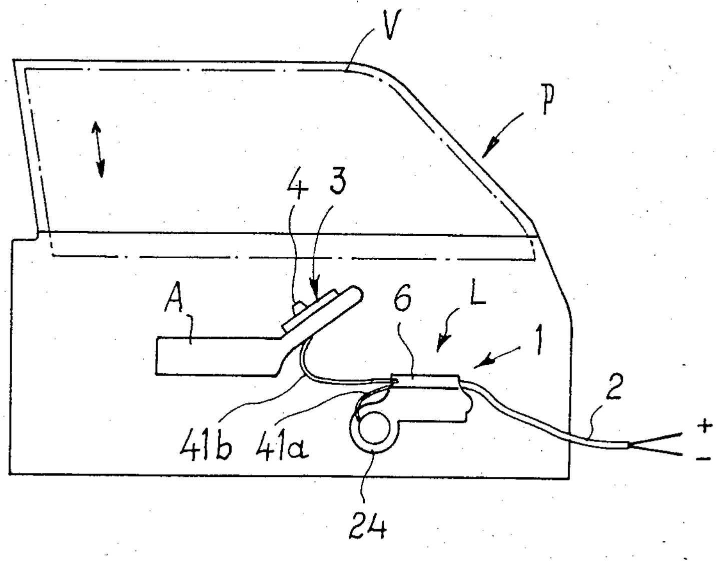
FIG. 1 is a diagrammatic elevational view of a vehicle door in which is incorporated a window glass raiser including a control device according to the invention.
Figure 4:
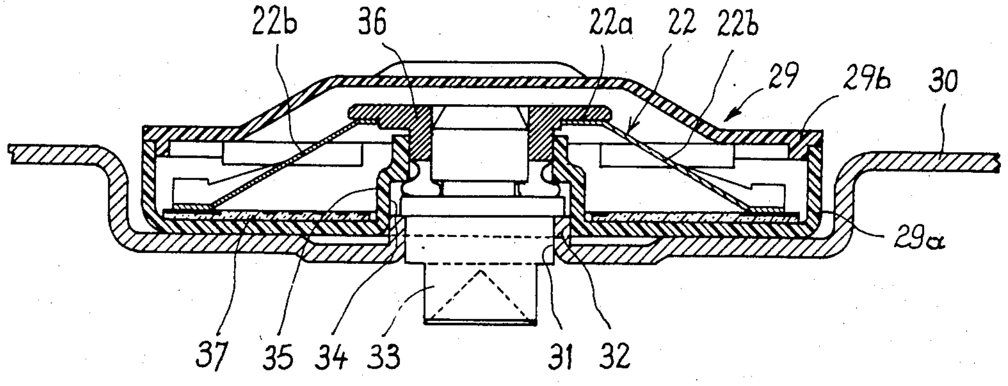
FIG. 4 is an axial sectional view taken on line 4—4 of FIG. 3.

FIG. 1 shows diagrammatically the door P of a motor vehicle equipped with a window glass raiser L. The latter comprises a driving device 1 which is mechanically connected to a mechanism (not shown) driving a window glass V which is for example of the type comprising crossed arms and a toothed sector. The driving device is connected to the electric power supply of the vehicle through a two-wire cable 2.

The assembly also includes a setting case 3 having a control knob 4 here shown by way of example mounted on an arm-rest A of the door P.

Note that the invention is not limited to its application to a glass raiser such as that just described briefly. On the contrary, it may be applicable whenever it concerns shifting any object in the motor vehicle field, such as an opening panel or another movable element in the construction of a motor vehicle.

Figure 2:
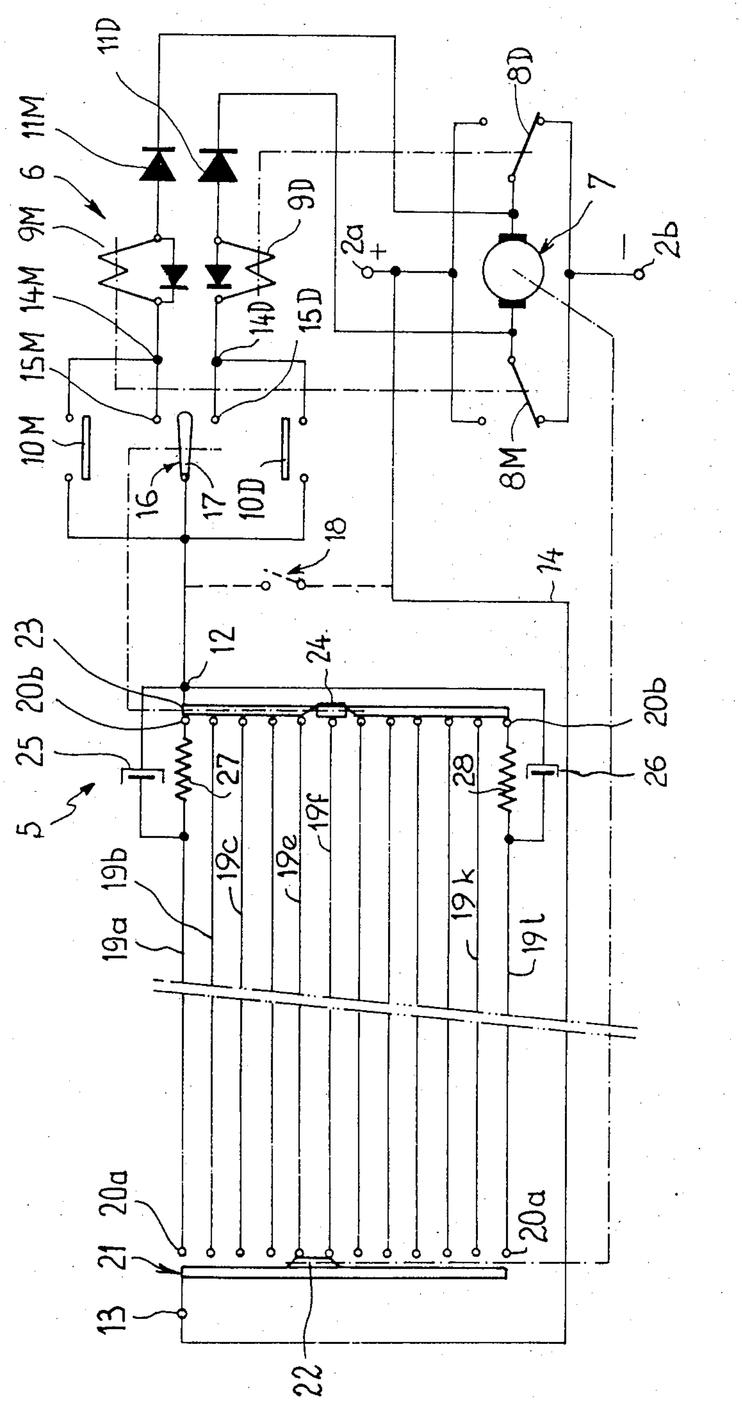
FIG. 2 is an electric diagram of the device according to the invention.
Figure 5:
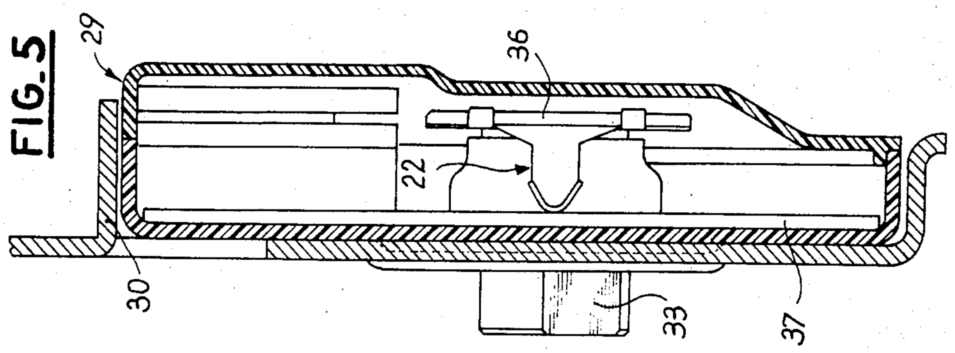
FIG. 5 is a sectional view of the device shown in FIG. 3 taken on line 5—5 of this Figure.

Reference will now be made to FIG. 2 which shows an electric diagram of the control device according to the invention.

The two wires of the cable 2 (FIG. 1) are connected to supply terminals *2a* and *2b* of the circuit shown in FIG. 2. These terminals supply current to the series circuit of the control device generally designated by the reference numeral 5 and the control circuit 6 of a driving motor 7 which is coupled to the mechanism shifting the glass V, as described hereinbefore.

It can be seen that the armature of the motor 7, which is preferably of the type having permanent magnets, is connected by two reversing switches 8M and 8D to the terminals *2a* and *2b* in such manner that the motor 7 can be controlled for rotation in both directions of rotation, the reversing switch 8M being associated with the rising of the glass and the reversing switch 8D with the reverse movement of this glass.

The reversing switches 8M and 8D are contacts actuated by respective relay coils 9M and 9D, these coils also controlling working contacts 10M and 10D respectively.

The connections of these various components are achieved in the following manner:

The junction between the reversing contact of the reversing switch 8D and the armature of the motor 7 is connected to the cathode of a diode 11M whose anode is connected to one of the sides of the coil 9M. Likewise, the junction between the armature of the motor 7 and the reversing contact 8M is connected to the cathode of a diode 11D whose anode is connected to one of the sides of the coil 9D. The opposite sides of the coils 9M and 9D are respectively connected to the working contacts 10M and 10D which are moreover together connected to a first terminal 12 of the control device 5. The latter comprises another terminal 13 which is connected by a conductor 14 to the positive supply terminal 2a. The respective junctions 14M and 14D between the coils 9M and 9D and the working contacts 10M and 10D are connected to two fixed contacts 15M and 15D of a reversing switch 16 whose moving contact 17 is connected to the terminal 12. The reversing switch 16 constitutes means for selecting the direction of rotation of the glass raiser and the construction of these selecting means will be described hereinafter.

There will now be brifly examined the operation of the circuit just described with reference for the moment to the control device 5 which in fact constitutes in a very simplified manner a switch which is interposed between the positive terminal *2a* and the junction point between the working contacts 10M and 10D. This switch has been shown in dotted lines in FIG. 2 and designated by the reference numeral 18. It will thus be understood that this switch is imaginary and that its function is performed by the control device 5, as will be understood hereinafter.

It can be seen that, when the moving contact 17 of the switch 16 is placed on one or the other of the fixed contacts 15M or **15*d*, the relay coil 9M or 9D corresponding thereto is energized, this energization being immediately received by the respective working contact 10M or 10D which thus constitute self-supplied contacts of the corresponding coils. Of course, it is assumed that the imaginary switch 18** is closed and that the positive voltage of the terminal *2a* is applied to the circuit. The energization of one of the coils 9M or 9D reverses the corresponding reversing switch 8M or 8D so that the motor 7 is driven in the direction for raising or lowering the glass, as the case may be. This consequently shifts the glass V in the corresponding direction (FIG. 1). The supply of current to the motor 7 is interrupted as soon as the switch 18 is opened which cuts off the supply of positive voltage of the circuit.

The theoretical construction of the control device 5 will now be examined. FIG. 2 shows that this device comprises a series of conductors **19*a* to 19*l*, which are twelve in number in the illustrated embodiment. These conductors are adjacent to each other and each includes two ends 20*a* and 20*b*. The ends 20*a* cooperate with a slider 21, hereinafter termed a copying slider, which includes a bridge element 22 which is capable at each instant of establishing an electric connection between two adjacent ends 20*a* of the conductors 19*a* to 19*l*. Mechanically, the slider 21 is connected to the motor 7 and it can effect a total travel which corresponds to that of the glass V. In other words, in FIG. 2, for example, when the glass is in its upper position, the slider 22 is in contact with the contactors 19*a* and 19*b* and, in its lower position, it is applied against the conductors 19*k* and 19*l***.

The opposite ends **20*b* of the conductors are together connected to a contact 23 which is elastically connected to the terminal 12, except for the connection of one of the ends 20*b* among all the ends of the conductors 19*a* to 19*l*. In the embodiment illustrated in FIG. 2, this end which constitutes an exception is that of the conductor 19*f*. In order to ensure the selective isolation of the ends 20*b* of the conductors, a setting slider 24 is provided which is mechanically capable of travelling along the ends 20*b* and which, as will be understood hereinafter, is located in the setting case 3 and mechanically coupled with the control knob 4. Further, the setting slider is connected, through a temporary connection described hereinafter, to the moving contact 17 of the reversing switch 16**.

It can be seen that the terminal 16 is connected, on one hand, to the conductor **19*a* through a capacitor 25 and, on the other hand, to the conductor 19*l* through a capacitor 26 and that the respective resistors 27 and 28** are inserted in these conductors. The purpose of these components will also be described hereinafter.

The control device 5 operates in the following manner:

The reversing switch 16 is mechanically connected to the slider 24 so that, when the moving contact 17 is placed on one or the other of the contacts 15M or 15D, the slider can be in turn shifted in the corresponding direction so as to isolate one end **20*b* of one of the conductors 19*a* to 19*l***. Under these conditions, the positive voltage of the terminal *2a* is applied, through the bridge element 22 and the associated conductors, to the contact element 23 which transmits the positive voltage to the control circuit 6, so that the motor 7 is supplied with current through the coil of the selective relay, the latter receiving its self-supply immediately after the action of selection. Thus, the motor can continue to rotate with no other intervention on the part of the user until the bridge element 22 resumes contact with the conductor on which the slider 24 was placed at the moment of selecting. The circuit is then broken and the motor stops.

It will be observed that the action on the reversing switch 16 has no need to be prolonged beyond the time required to ensure that the self-supply of the coil 9M or 9D is established. Further, the action on the reversing switch 16 always remains a priority action. If the user changes his mind when the motor 7 is operating and he shifts the reversing switch in the direction opposed to that corresponding to the movement occurring:

(a) if the conductor which corresponds to the coincidence between the bridge element 22 and the slider 24, the movement stops in the new position of the slider 24;

(b) if the conductor which corresponds to the coincidence between the two sliders 22 and 24, the corresponding coil is de-energized and the procedure continues in respect of the new setting until coincidence occurs.

In order to avoid an undesired simultaneous energization of the two coils 9M and 9D owing to a very short and involuntary contact in the reversing switch 16, the coils 9M and 9D may be immediately connected to the negative terminal *2d* through the respective contacts 8M and 8D.

The diodes 11M and 11D also have for function to avoid any risk of supplying current to the coils 9M and 9D by the operation of the driving motor 7 as a current generator (when breaking the circuit) which would considerably increase the response time of the circuit. The capacitors 25 and 26 and the resistors 27 and 28 have for purpose to compensate for the relatively wide tolerances of the travel of the window glass V (which may be on the order of a centimeter) and to achieve a complete opening or closure at the end of the travel, the charged capacitors 25 and 26 ensuring that the supply is maintained during the time required for completing the travel and for producing a certain pressure of the glass against its sealing elements. The resistors 27 and 28 have for purpose to limit the discharged current of the capacitors 25 and 26 respectively, which avoids the deterioration of the associated contacts **20*b***.

There will now be described a mechanical embodiment of the copying slider 21 and of the bridge element 22 with reference more particularly to FIGS. 3 to 6.

The copying slider 21 is mounted in a case 29 which is fixed to a plate 30 secured to the door, the case comprising two parts 29a and 29b which are hermetically fitted together so as to enclose in a sealed manner the electric parts of the copying slider. The plate 30 is provided with a central opening 31 which has a flange 32 acting as a bearing for a pin 33 which is connected to rotate with the toothed sector (not shown) of the mechanism driving the glass V or any other component connected to rotate with the motor 7. It will be observed that the part 29a of the case 29 also includes a central opening 34 provided with a flange 35 which is closed in a sealed manner onto a guiding washer 36 connected to rotate with the pin 33. The washer 36 supports the bridge element 22 with which it rotates. In other words, the pin 33 is driven in rotation and the bridge element 22 is rotated about the axis of this pin.

The bridge element 22 comprises an annular central part 22a from which extend radially outwardly two connecting arms 22b which are inclined toward the bottom of the part 29a of the case 29, these arms terminating in respective contact members the lateral ends of which are bent upwardly.

Figure 3:
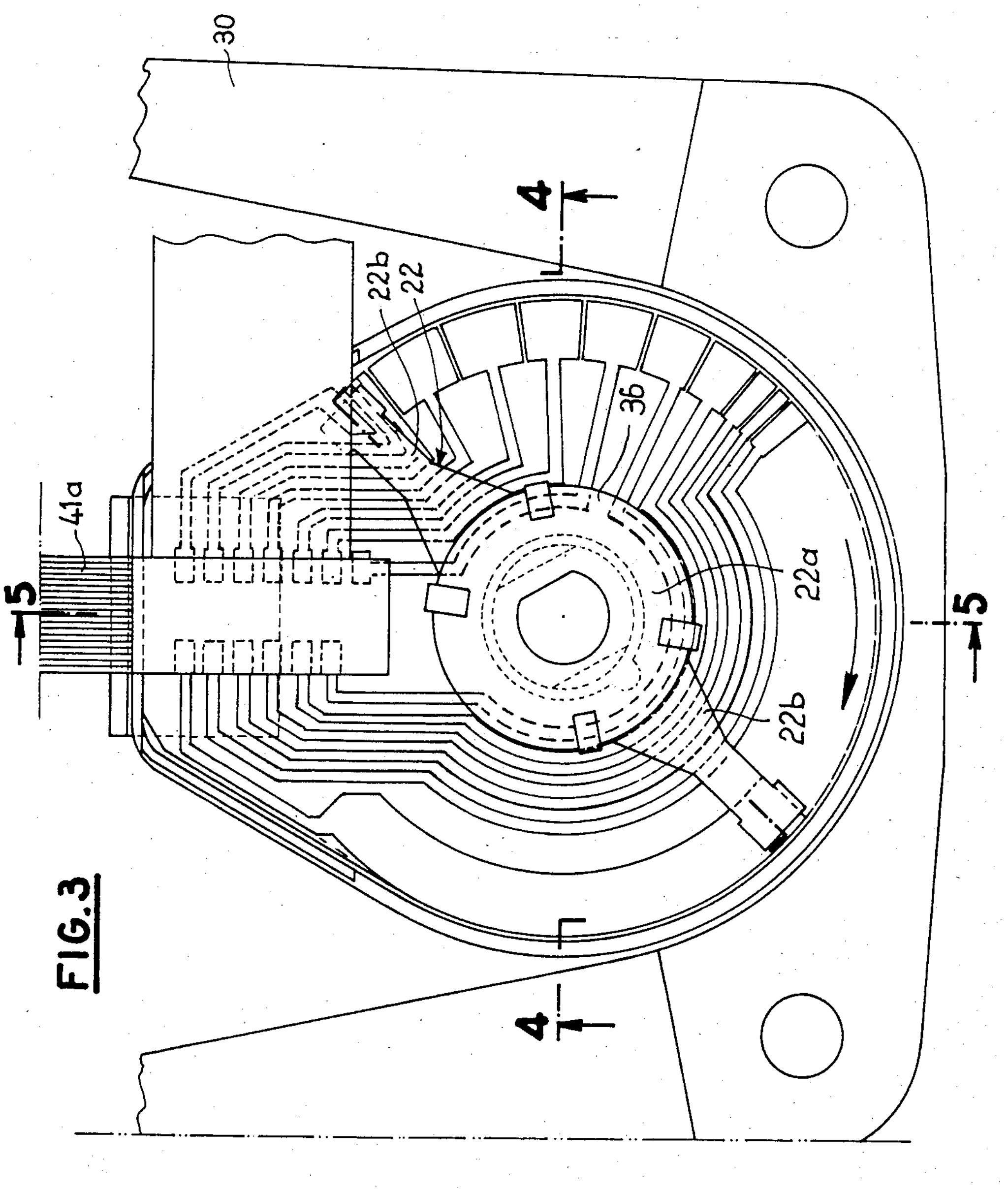
FIG. 3 is an elevational assembly view of the copying slider and of its associated elements disposed in a housing whose cover has been removed.
Figure 6:
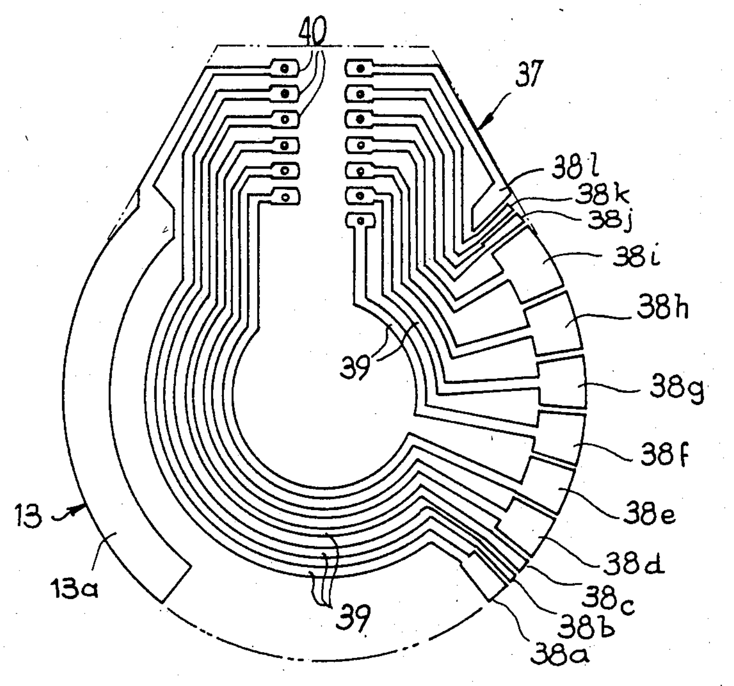
FIG. 6 is a view to a reduced scale of the printed circuit disposed in the housing shown in FIG. 3.

Placed on the bottom of the part 29a is a printed circuit card 37 the circuit of which has been shown in detail in FIG. 6. This printed circuit comprises, first of all, a contact band 13a which electrically constitutes the terminal 13 shown in FIG. 2. It also includes a series of contact studs 38a to 38l which constitute the ends 20a of the conductors 19a to 19l which are also shown in FIG. 2. The contact studs 38a to 38l are respectively connected through contact bands 39 having appropriate configurations to terminals 40 which are respectively connected to a multi-wire conductor 41a (FIG. 3). As shown in FIG. 1, this conductor is connected between the case 29 and a case which contains the control circuit 6 (FIG. 2). The terminal 13 is of course connected through this same conductor to the case 42.

It can be seen in FIG. 6 that the contact studs 38a and 38b do not have the same angular dimension, those located at the ends of the assembly being smaller. Indeed, the angular extent of the studs determines the "pitch" of the positioning of the glass along its moving path. The wider a stud the greater will be the displacement of the glass. The fact that the end studs are smaller permits the obtainment of a fine adjustment of the position of the glass in the upper end of its travel (current of air) and in the lower part of its travel.

The copying slider 22 is connected to rotate with the pin 33 whose angular position is a function of the position of the glass V. It therefore connects in a selective manner the terminal 3 to one of the contact studs 38a to 38l and consequently the corresponding conductors 19a to 19l. The contact bands 38 of course only constitute a part of the conductors 19a to 19l shown in FIG. 2, and they are connected to the other electric connections 41b leading to the setting case 3, as will now be explained with reference to FIGS. 7 to 16.

The control case 3 comprises a case body 42 having a generally parallel-sided shape and a cover 43 which constitutes a slideway for the control knob 4. The cover 43 has a longitudinal slot 44 which is normally closed by the lips 45 of a resiliently yieldable closure member 46 which is fixed in the bottom of a longitudinal groove formed in the lower side of the slideway 43.

The control knob 4 comprises a push-member 48 which is longitudinally slidable in the slideway 43 owing to the provision of a tong -and-groove arrangement. The knob 4 also includes a slider 49 which is slidably mounted in the body of the case 42 between the lateral walls of the latter. This slider has the shape of a rectangular block and includes a central aperture 50 which has a square section and extends throughout the block. This aperture communicates with two longitudinal notches 51a and 51b, the depth of which is roughly equal to one half of the height of the block. It also communicates with two lateral notches 52a and 52 having the same depth. Further, each of these lateral notches 52a and 52b communicates with the lower side of the block through vertical slots 53a and 53b which extend throughout the material of the block defined by these lateral notches. Two grooves 54a and 54b extend from the vertical slots 53a and 53b respectively toward one of the edges of the block on the lower side of the latter.

Figure 7:
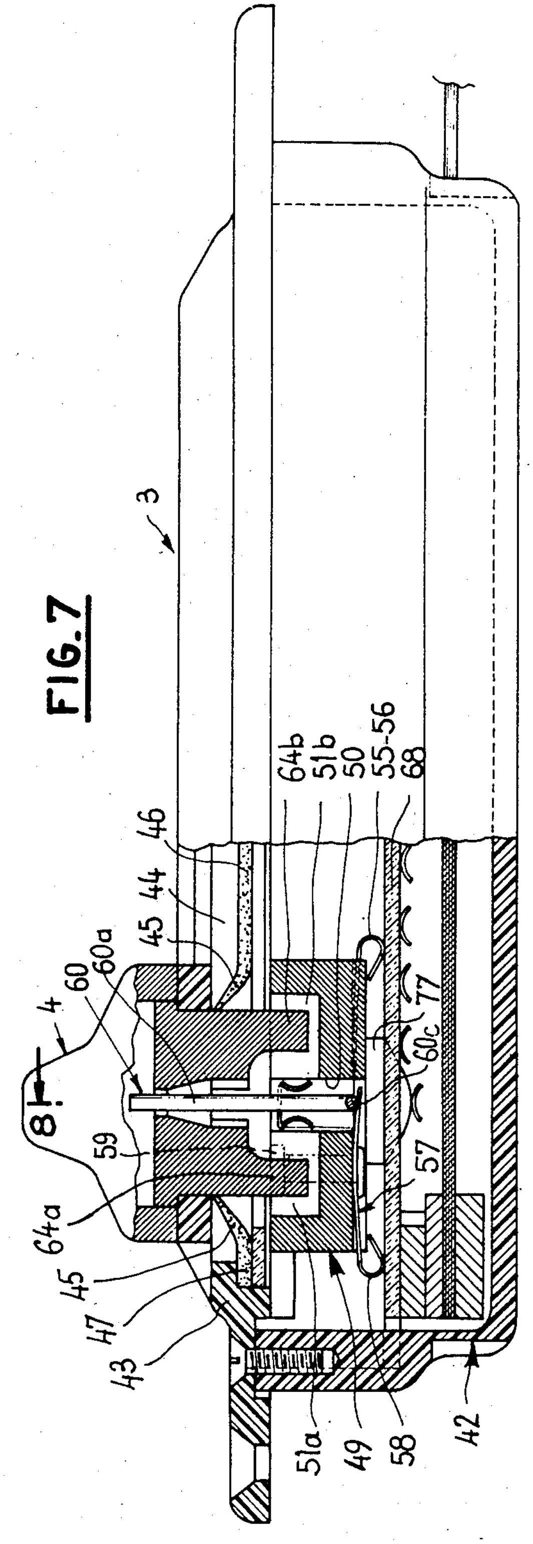
FIG. 7 is an elevational view, partly in section, of a setting case of the device according to the invention.
Figure 13:
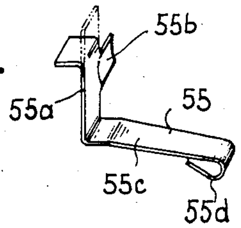
FIGS. 12, 13 and 14 are perspective views of three contact members disposed in the setting case.
Figure 14:
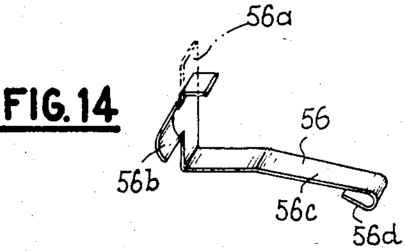
Figure 15:
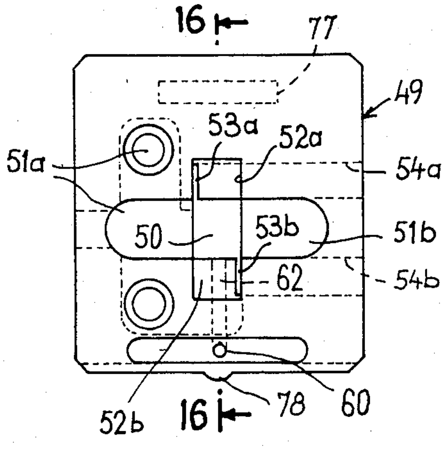
FIG. 15 is a plan view of a slide pertaining to the slider of the setting case.
Figure 16:
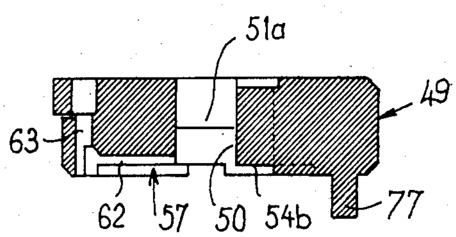
FIG. 16 is a sectional view taken on line 16—16 of FIG. 15.

FIGS. 13 and 14 show two sliding contacts 55 and 56 which are disposed in the block in the following manner:

The two sliding contacts are each made from a suitably bent conductive resiliently yieldable strip. The sliding contact 55 has the general shape of an L, with a vertical branch 55a from which laterally projects a contact stud 55b and a roughly horizontal branch 55c which is curved at its free end so as to form at 55d a sliding contact tab. The sliding contact 56 shown in FIG. 14 has roughly the same L shape with branches 56a and 56c, a lateral contact stud 56b and a curved sliding contact 55d. Note that for the purpose of securing it in the block of the slider 49, the free end of the branches 55a and 56a are bent at a right angle so as to be applied against the ends of the lateral notches 52a and 52b, the branches 55c and 56c being respectively engaged in the longitudinal grooves 54a and 54b of the block. As can be seen in FIG. 7, under these conditions, the curved sliding contact portions 55d and 56d slightly project from the lateral side and from the lower side of the slider 49 (on the right side in FIG. 7).

Figure 12:
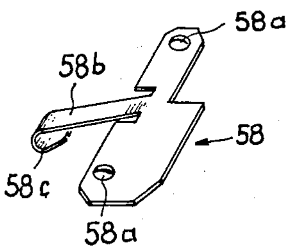

Provided in the lower side of the block of the slider 49 is also a cavity 57 having roughly the shape of an L and adapted for the fixing of a third sliding contact 58 which is shown in FIG. 12. This sliding contact, which is also made from a conductive resiliently yieldable strip of metal, has a shape adapted to the shape of the cavity 57, that is, the shape of a small plate having two end portions in which fixing apertures 58a are provided and from which laterally projects a contact arm 58b which is slightly downwardly inclined and has at its free end a curved sliding contact portion 58c.

Figure 8:
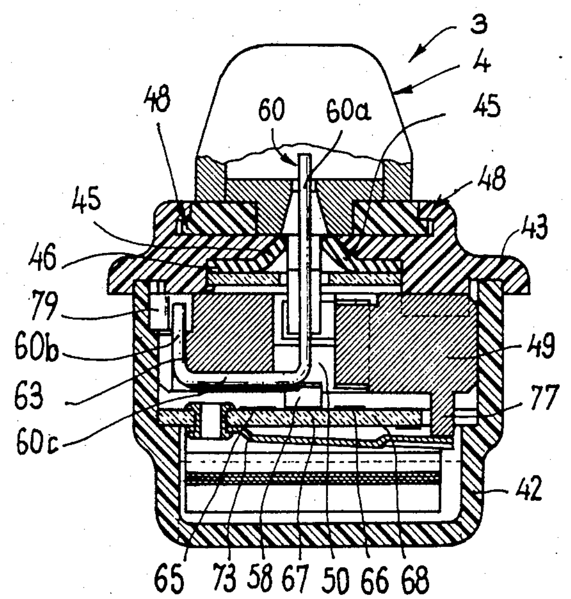
FIG. 8 is a sectional view of this case, taken on line 8—8 of FIG. 7.

FIGS. 7 and 8 show that the third sliding contact is disposed below the block so that its contact tab 58b extends in a direction which is opposed to that in which the arms 55c and 56c of the first and second sliding contacts extend. Note moreover that, as the sliding contact portions 55d and 56d, the curved sliding contact portion 58c of the third sliding contact projects beyond the lateral side and the lower side of the slider 49. The third sliding contact is connected to the latter by means of two rivets 59 which extend therethrough in the downward direction. A spring 60 for the selection of the direction of operation is also disposed in the control knob 4. As shown in FIGS. 7 and 8, this spring has three branches 60a to 60c, the first two branches extending vertically and being interconnected by a horizontal portion which is disposed in a longitudinal groove 62 provided on the lower side of the block. The vertical branch 60a extends upwardly through the central aperture 50 of square sectional shape, and the branch 60b is engaged in an offset aperture 63 which extends through the block close to one of its lateral sides (see FIGS. 8 and 16).

The vertical branch 60a of the spring 60 is adapted to cooperate with the contact studs 55b and 56b for selecting the direction of operation of the motor M.

FIG. 7 shows that the push-member 48 comprises two driving tabs 64a and 64b which extend downwardly and are engaged in the longitudinal notches 51a and 51b of the slider 49. Further, this push-member has a central aperture which axially coincides with the aperture 50 of square sectional shape of this slider. This aperture receives the branch 60a of the spring 60 with a slight clearance defined at the upper end of this branch. As can be seen, the push-member 48 has a certain freedrom of longitudinal movement relative to the slider 49 when it is not depressed by the user. In this case, the driving tabs are disengaged from the end walls of the longitudinal notches 51a and 51b. This position of rest corresponds to the unstressed shape of the spring 60.

When the push-member 48 is shifted in a longitudinal direction, for example toward the right, as viewed in FIG. 7, it deforms the branch 60a in the same direction in taking up the clearance which exists between the end wall of the corresponding longitudinal notch and the driving tab (in FIG. 7, it concerns the right driving tab). The deformation of the branch 60a creates an electric contact with one or the other of the contact studs of the sliding contacts 55 of 56 which has for result the establishment of an electric circuit between the fixed contact 15M or 15d and the moving contact 17 shown in FIG. 2. In other words, the studs 55b and 56b and the branch 60a respectively correspond to the contacts 15M, 15D and 17.

Figure 10:
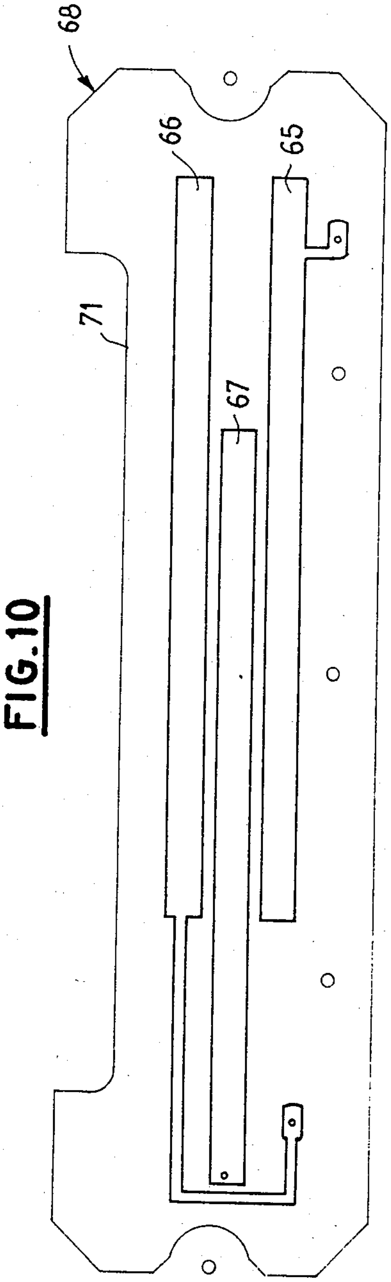
FIG. 10 is a plan view of a first side of a printed circuit pertaining to this setting case.
Figure 11:
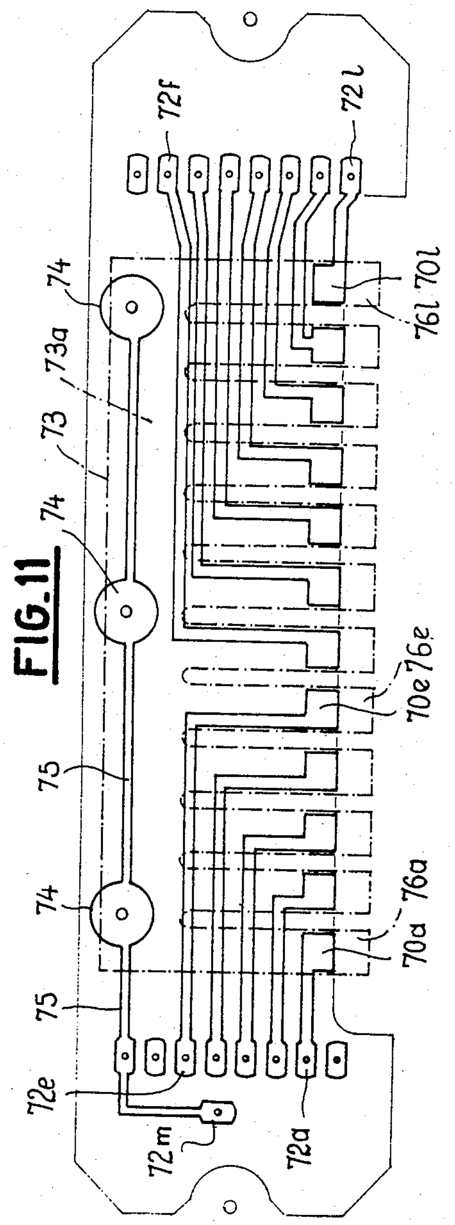
FIG. 11 is a view of the other side of the printed circuit shown in FIG. 10.

The sliding contacts 55, 56 and 58 respectively cooperate with contact tracks 65, 66 and 67 which are disposed on one of the sides of a printed circuit card 68 (FIGS. 10 and 11). These tracks, which extend in parallel directions, are slightly longitudinally offset so that each one is capable of being in permanent contact with the associated sliding contact throughout the travel of the slider 49 in the case body 42.

The opposite side of this card includes a number of conduction bands 69a to 69l which extend between contact areas 70a to 70l disposed in a row along the longitudinal edge of a recess 71 provided in the card 68 and connection terminals 72a to 72l disposed in two longitudinal rows at each end of the card.

A contact comb 73 (FIGS. 7, 8 and 11) is fixed against the lower side of the card 68. For this purpose, there are provided along the edge of the card opposed to the recess 71, three rivets 74 which are spaced apart in the longitudinal direction and connected to each other by conduction bands 75 leading to a terminal 72m of the card.

The comb 73 has a generally rectangular shape and includes a solid band 73a from which laterally extend teeth 76a to 76l which respectively cooperate with contact areas 70a to 70l of the card. In FIG. 11, in which the comb is shown in dot-dash lines, it can be seen that the teeth 76a to 76l extend beyond the lower edge of the recess 71 and cooperate (FIG. 8) with a lower boss 77 of the slider 49. FIG. 7 shows that this boss 77 is capable of selectively urging back the teeth 76a to 76h relative to the contact area 70a to 70l in the course of the longitudinal movement of the control knob 4. Consequently, this assembly constitutes the setting means 23 and the setting slider 24 shown in FIG. 2.

The track 67 of the upper side of the card 68 is electrically connected to the comb 73 through one of the conduction bands 75, which establishes an electric circuit between the latter and the branch 61a of the spring 60 through the third sliding contact 58. It will be understood that this circuit corresponds to the circuit shown in FIG. 2 (terminal 12).

Figure 9:
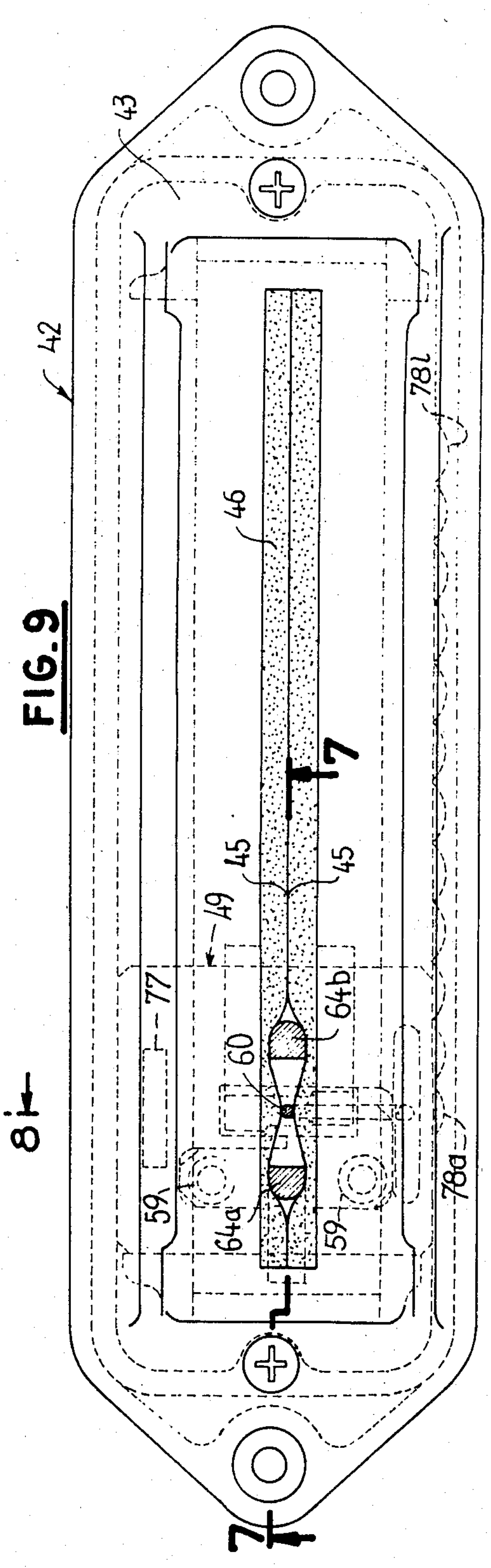
FIG. 9 is a plan view, partly in section, of the setting case.

FIGS. 8 and 9 show that, in the lower side of one of the lateral walls of the case body 42, there are provided recesses 78a to 78l which are disposed along a row and whose spacing corresponds to that of the contact areas and of the teeth of the comb described hereinbefore. The recesses 78a to 78l cooperate with a resiliently yieldable lug 79 which is formed on the slider 49, the assembly being thus capable of fixing the twelve positions that the control knob is capable of occupying in the case 3.

It is clear from the foregoing description that the control device according to the invention permits a convenient adjustment of the position of an opening panel by a simple positioning of the knob 4, which operation may be of comparatively short duration. The copying slider catches up with the setting slider indeed entirely automatically and requires no intervention on the part of the user after the positioning of the knob 4. Safety and conVenience of utilization are therefore improved.

What is claimed is:

1. A device for electrically controlling the position of a sliding opening panel of a motor vehicle, said device being connected to a power supply in series with a control circuit of a driving motor for shifting the panel between a closing position and an opening position said device comprising a series of conductors which are electrically connected in parallel and mechanically disposed in adjacent positions relative to one another, said conductors materializing a particular position that the panel is capable of occupying in its travel between said closing position and said opening position, all the conductors except one being connected together by a first of their ends so as to form a first terminal of said control device, a setting slider having an adjustable position which sets the position that the panel must reach and which is operative to selectively break the connection of said first ends, all the conductors having second ends opposed to said first ends, a copying slider comprising a bridge element associated with said second ends and constituting a second terminal of said control device and capable of selectively connecting together the second ends of pairs of adjacent conductors, said copying slider being adapted to be connected to move with said panel.

2. A device according to claim 1, wherein said control circuit comprises means for selecting the direction of rotation of said motor, said selecting means being connected in series with one of said terminals of said control device.

3. A device according to claim 1, comprising a setting case and a copying case multi-wire cables interconnecting said two cases, said setting case being placed in a region easily accessible to the user and said copying case being placed in a region where it can be coupled to an output shaft of said motor, said conductors extending between said setting case and said copying case.

4. A device according to claim 3, for a sliding panel combined with a rotatable element drivenly coupled to said motor, wherein said copying slider is rotatively mounted in said copying case and coupled to a shaft which is connected to rotate with said rotatable element, said second ends of said conductors comprise contact stud areas of a printed circuit card disposed in said copying case, and said contact stud areas are disposed on an arc of a circle concentric with an axis of rotation of said shaft and are capable of being connected to said second terminal of said control device through a sliding contact which constitutes said bridge element.

5. A device according to claim 4, wherein said second terminal is made from a contact band in the shape of an arc of a circle and disposed on said card in a position diametrically opposed to said contact stud areas, and said sliding contact comprises a central portion connected to said shaft and two radial contact arms which respectively cooperate with said contact band and with said contact stud areas.

6. A device according to claim 2, comprising a relay circuit including self-supply contacts, said motor being controlled through said relay circuit, said setting slider and said selecting means selecting the direction of rotation of said motor being mounted together in a single control knob which includes means for selectively establishing two fugitive circuits controlling the rotation of said motor corresponding to each direction of rotation of said motor and establishing the self-supply in said relay circuit.

7. A device according to claim 6, wherein said circuit establishing means comprise a contact spring which is capable of selectively closing a selected one of said fugitive circuits by a resiliently yieldable deformation when said setting slider is brought from a given actual position to a new setting position.

8. A device according to claim 7, wherein said setting slider comprises first and second sliding means forming said control knob and movably mounted in said setting case to move along a setting path, said sliding means being movable relative to each other in opposition to resilient deformation of said spring and including mutual driving means respectively operative after deformation of the spring so as to ensure the movement of said first and second sliding means in unison with each other.

9. A device according to claim 8, comprising a printed circuit card comprising contact tracks and disposed in said setting case, said control knob including sliding contacts which are cooperative with said contact tracks and said control knob being provided with an actuating means which, in the course of the movement of said knob for selecting, is capable of selectively opening adjacent switches respectively connected to said adjacent conductors and disposed on said printed circuit card.

10. A device according to claim 5, wherein said contact stud areas provided in said copying case have angular extents which are different, depending on the travel of said copying slider, so as to determine the length of "pitches" of displacement of said panel.

11. A device according to claim 1, comprising capacitors inserted between said first terminal and end conductors of said series of conductors.

* * * * *